United States Patent [19]
Floessel

[11] 3,786,169
[45] *Jan. 15, 1974

[54] INSULATION GAS FILLED ENCAPSULATED HIGH VOLTAGE ELECTRICAL CONDUCTOR

[75] Inventor: Dieter Floessel, Fislisbach, Switzerland

[73] Assignee: Brown Boveri & Company Limited, Baden, Switzerland

[*] Notice: The portion of the term of this patent subsequent to June 12, 1990, has been disclaimed.

[22] Filed: July 12, 1972

[21] Appl. No.: 271,002

[30] Foreign Application Priority Data
Sept. 20, 1971 Switzerland............... 13598/71

[52] U.S. Cl.............. 174/28, 174/13, 174/16 B, 174/99 B
[51] Int. Cl,........................................... H01b 9/04
[58] Field of Search.............. 174/13, 15 C, 16 B, 174/27, 28, 29, 25, 88 B, 99 B, 111; 138/113, 114, 121, 122

[56] References Cited
UNITED STATES PATENTS
| | | | |
|---|---|---|---|
| 3,688,015 | 8/1972 | Graybill | 174/16 B |
| 3,221,097 | 11/1965 | Cognet et al. | 174/99 B |
| 2,355,111 | 8/1944 | Rouault | 174/28 |
| 2,191,071 | 2/1940 | Duttera | 174/28 |
| 1,978,649 | 10/1934 | Roberts | 174/27 UX |
| 1,935,313 | 11/1933 | Feldman | 174/28 |

FOREIGN PATENTS OR APPLICATIONS
879,601   3/1943   France................ 174/28

Primary Examiner—Bernard A. Gilheany
Assistant Examiner—A. T. Grimley
Attorney—Ralph E. Parker et al.

[57] ABSTRACT

A high-voltage tubular electrical conductor is encapsulated within a pressurized insulation gas filled rectilinear tubular casing and supported centrally within the casing by longitudinally spaced support-insulators each of which is provided with three legs spaced 120° apart about the conductor. Two of the legs are fixedly secured to the conductor structure and include rolling means in the form of balls at their outer ends to facilitate abrasion-free insertion of the conductor-support insulator assembly within the casing. The third leg is supported by the tubular conductor for movement in a radial direction by a pneumatic drive mechanism to enable the leg to be moved from a radially inward position establishing an initial clearance with the wall of the casing during insertion of the conductor and support insulator assembly to a radially outward position establishing a spring-loaded elastic pressure contact with the casing wall thereby to secure the support-insulator in position against longitudinal displacement. The pneumatic drive mechanism for the radially displaceable leg is constituted by a piston located within the conductor, the piston being actuated by introduction of the pressurized insulating gas into the conductor and casing and including a tapered surface portion which forces the leg radially outward.

10 Claims, 3 Drawing Figures

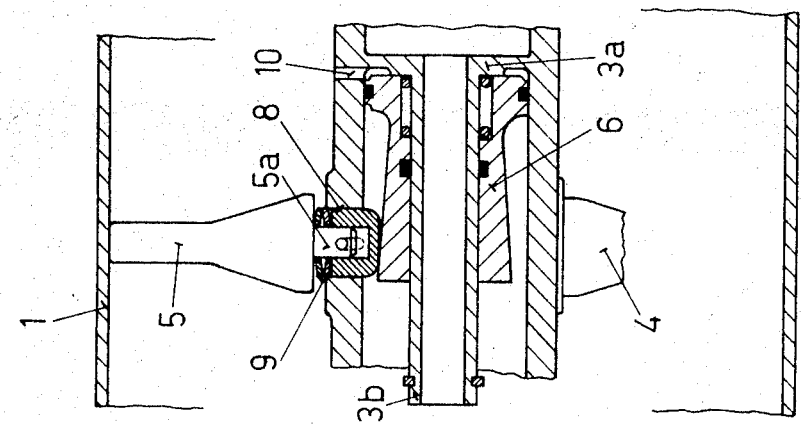
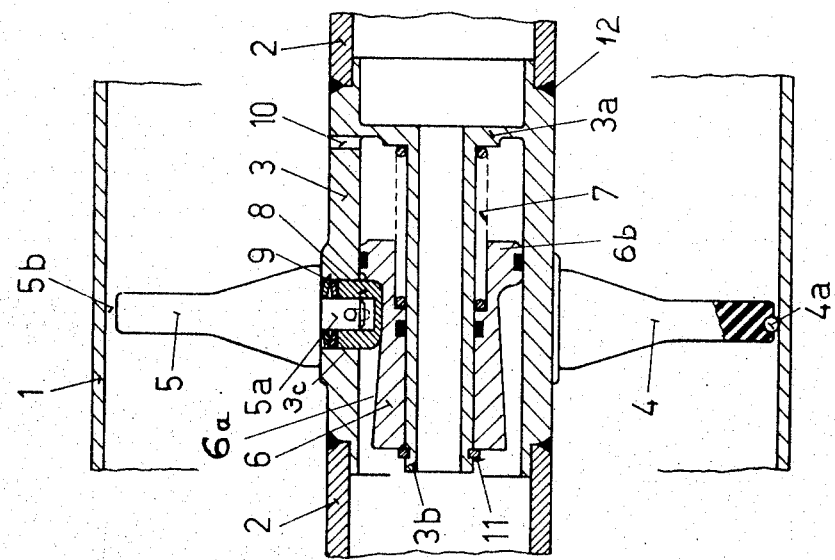
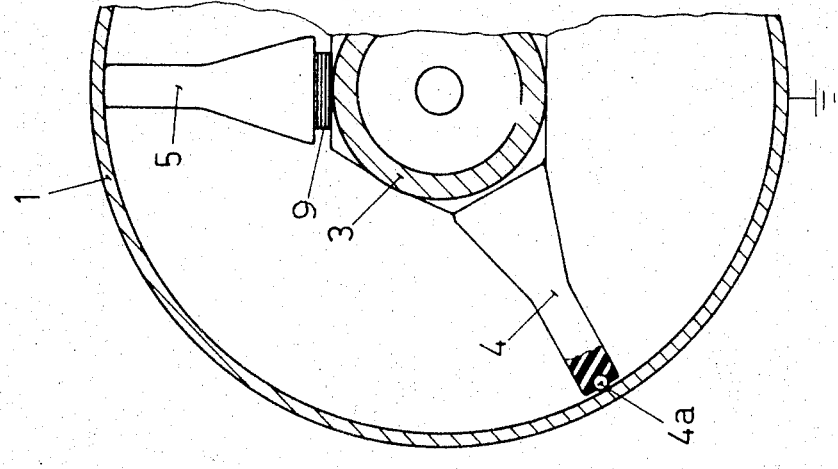

INSULATION GAS FILLED ENCAPSULATED HIGH VOLTAGE ELECTRICAL CONDUCTOR

The present invention relates to an improvement in the construction of insulation gas-filled tubular encased i.e., encapsulated high-voltage electrical conductors. More particularly, the invention concerns an enclosed high-voltage conductor of the general type wherein the conductor is held in place centrally within a rectilinear, grounded metallic casing by means of support insulators which are spaced longitudinally along the conductor.

Enclosed high-voltage conductor structures of this type are known to the industry, reference being made, for example, to the disclosure in U.S. Pat. No. 2,428,051 wherein the conductor is supported by three legs uniformly spaced about the conductor, i.e., 120° apart in the same plane, and which extend radially into engagement with the inner wall surface of the cylindrical enclosing casing structure. The inner ends of the legs are screwed to the conductor and the outer ends are provided with spring means which enable the legs to be maintained in place by spring-loaded frictional contact with the inner wall surface of the casing. This construction, however, suffers from the disadvantage that when the insulator-conductor structure is inserted within the casing, a certain amount of abrading unavoidably takes place as the spring components slide under radial pressure along the inner wall surface of the casing with the result that small bits and chips of metal collect within the casing. However, without an exceedingly high cost, it is impossible to remove all of such impurities from the interior of the casing, with the result that the electrical stability of the high-voltage line is adversely affected.

The principal objective of the present invention is to provide an improved multi-leg support insulator construction for encased and gas insulated high-voltage conductors which avoids the disadvantages of the prior known constructions and which enables the multi-leg support to be inserted into the enclosing casing without any abrading effect. The objective is attained in that an initial clearance is provided between the multi-leg support and the inner wall of the casing to permit abrasion-free insertion of the support to its appointed location within the casing, following which at least one leg of the multi-leg support is expanded radially to engage the inner wall of the casing and develop a pressurized, holding contact between the support and casing. More particularly, the pressureized holding contact between the multi-leg support and casing is established by a pneumatic drive located within the conductor, which latter has a tubular configuration, the drive including a piston advanced longitudinally within the conductor as the pressurized insulating gas is introduced into the casing, the piston including a tapered surface engaging the inner end of one leg of the support, which is mounted for radial movement in the wall of the conductor and causing the leg to be displaced in the radial direction to engage the inner wall of the casing. As a further feature of the invention, the pneumatic drive is mounted within a nipple interconnecting the ends of two conductor sections joined together by the nipple.

The foregoing as well as other objects and advantages inherent in the improved encapsulated conductor structure will become more apparent from the following description of a preferred embodiment thereof and from the accompanying drawings wherein:

FIG. 1 is a transverse section through the encapsulated conductor in the vicinity of the insulator support structure; and FIGS. 2 and 3 are views in diametral section of the encapsulated conductor showing the details of the pneumatic drive and legs of the support insulator, FIG. 2 depicting the radially driven leg in the initial loosened position, clearing the wall of the casing, and FIG. 3 depicting the radially driven leg in its holding position against the inner wall of the casing.

With reference now to the drawings, wherein corresponding reference numerals are used for corresponding structural components in all figures, the encapsulated conductor structure includes a rectilinear cylindrical tubular casing 1 which preferably is made from aluminum and earthed as indicated by the conventional symbol. Located centrally within the casing 1 is the high-voltage conductor structure consisting of cylindrical tubular conductor sections 2, 2 which are joined together by a tubular coupling nipple 3. The opposite ends of the nipple are provided with portions of reduced diameter which are inserted within the ends of the conductor sections 2, 2 and welded thereto by circular welds 12.

The multi-leg insulator support structure for the conductor consists of three legs 4, 4 and 5 spaced 120° apart around the conductor and which are located in the same plane. As depicted in FIG. 2, each of the two legs 4, 4 is provided at its inner end with a foot portion, not shown, of reduced cross-section which is inserted in an opening in the wall of nipple 3 having a complementary configuration and secured thereto by any suitable means such as an adhesive. The outer end of each leg 4, 4 is provided with an anti-friction rolling means such as balls 4a made from metal or plastic. During installation of the conductor-support insulator assembly within casing 1, these roll means 4a at the outer ends of the two legs 4, 4 ensure easy and abrasion-free relative longitudinal movement between the casing and the conductor-support insulator assembly, there being at such time a clearance 5b between the third leg 5 and the casing wall, as depicted in FIG. 2.

As previously indicated, this third leg 5 is mounted for movement in a radial direction and is actuated by a pneumatic drive. To this end, a cup-shaped part 8 is mounted for sliding movement within an opening 3c through the wall of nipple 3, and inserted into the outer open end of the cup 8 is the inner end 5a of the leg 5 and which has a reduced cross section. Cup springs 9 surround the inner end 5a of leg 5 and provide an elastically yieldable drive between cup 8 and leg 5. The inner end of cup 8 engages a longitudinally extending outer tapered surface 6a of a drive piston 6 having a cylindrical portion 6b slidable within its cylinder which, in the illustrated embodiment, is constituted by the internal surface of nipple 3. Integral with nipple 3 is an inner, longitudinally extending tubular support 3b on which the longitudinally bored piston 6 is mounted for longitudinal sliding movement. A retaining ring 11 secured on one end of the support part 3b provides a stop for piston 6 to limit its movement toward the left as viewed in FIG. 2, and an end wall 3a in conjunction with a compression spring 7 surrounding the tubular support 3b and located between the end wall 3a and piston 6 serves to limit piston movement toward the right. A port 10 is provided through the wall of nipple 3 in the vicinity of its end wall 3a.

As previously explained, the assembly of conductor structure 2, 3, 2 and its related tri-leg insulator support 4, 4, 5 are located with the encapsulating casing 1 by a sliding movement therebetween, in which the balls 4a on the two legs 4, 4 rollingly glide along the inner wall of the casing to the proper position, the third leg 5 being in its radially inward position as depicted in FIG. 2 to develop a clearance 5b between the outer end thereof and the casing wall. This casing 1 is now filled with the insulating gas under pressure, e.g., $SF_6$ at a pressure of 4 atmospheres. During this gas filling operation, the pressure will initially build up more rapidly within the interior of the tubular conductor structure 2-3-2 than in the remainder of the interior of the casing 1 with its substantially greater volume. As a result, piston 6 will be driven to the right, from its rest position depicted in FIG. 2 to the position depicted in FIG. 3. As piston 6 moves to the right, cup member 8 will be forced to move in a radially outward direction due to the action of the tapered surface portion 6a on the inner end of the cup member 8 thereby causing the outer end of leg 5 to be forced into pressure contact with the inner surface of casing 1, thus fixing the insulator structure against longitudinal displacement within the casing. The slope of the tapered surface portion 6a of the piston is designed in such manner that in the clamped position (FIG. 3) self-locking by friction will occur between it and cup member 8.

Cup 8 imparts movement to leg 5 indirectly by way of the cup springs 9 which serve two functions. One function is to prevent excessive radial pressure by the legs 4, 4, 5 upon casing 1 which otherwise could lead to deformations of the casing at the three points of contact with the legs; secondly, and most important, these springs provide compensation for any expansion or contraction of the casing and support insulator which may arise, for example, as a result of a change in temperature.

In order to dis-assemb'e the conductor structure and its supporting tri-leg insulators, for example, for inspection purposes, the gas pressure is relieved from within the conductor structure at a greater rate than relief occurs within the surrounding casing 1. The temporary excess pressure then acts upon the right side of piston 6 through port 10 and this pressure in conjunction with a restoring force built up in the compressed spring 7 causes piston 6 to return to the position depicted in FIG. 2 thus permitting leg 5 of the insulator structure to move radially inward and unclamp the insulator from the wall of casing 1. Finally, it will be understood that the conductor structure is supported within its casing by a number of the insulator supports constructed in accordance with the invention, and spaced along the conductor at the desired intervals. However, in order to simplify the drawings, only one of the conductor supports and the related portion of the casing have been included.

I claim:

1. An encapsulated gas-filled high-voltage electrical conductor structure comprising a rectilinear tubular metallic gas-filled casing, a rectilinear electrical conductor extending longitudinally within said casing, and at least one support insulator structure for centering said conductor within said casing and securing it against longitudinal displacement therein, said support insulator structure comprising at least three legs mounted on said conductor and extending radially in different directions therefrom in a common plane, the outer ends of a plurality of said legs secured to said conductor in fixed position being provided with rolling means to facilitate abrasion-free insertion of the conductor-support insulator assembly within said casing in rolling contact with the inner wall thereof, and at least another one of said legs being movable in the radial direction and including pneumatic drive means therefor providing leg movement from a radially inward position establishing an initial clearance between its outer end and the inner wall of said casing to a radially outward position following insertion of said conductor-support insulator assembly and establishing a pressurized contact with the inner wall of said casing thereby to secure said conductor-support insulator assembly against longitudinal displacement within said casing.

2. An encapsulated gas-filled high-voltage electrical conductor structure as defined in claim 1 wherein said pneumatic drive means for said radially movable leg is actuated by the pressurized insulating gas during the gas-filling operation.

3. An encapsulated insulation gas-filled high-voltage electrical conductor structure comprising a rectilinear tubular metallic gas-filled casing, a rectilinear tubular electrical conductor extending longitudinally within said casing, and at least one support insulator structure for centering said conductor within said casing and securing it against longitudinal displacement therein, said support insulator structure comprising three legs mounted on said conductor and extending radially in different directions therefrom in a common plane, the outer ends of two of said legs secured to said conductor in fixed position being provided with rolling means to facilitate abrasion-free insertion of the conductor-support insulator assembly within said casing in rolling contact with the inner wall thereof, and the third leg being mounted on said conductor for movement in a radial direction and including a pneumatic drive located within said conductor providing movement of said third leg from a radially inward position establishing an initial clearance between its outer and and the inner wall of said casing to a radially outward position following insertion of said conductor-support insulator assembly and establishing a pressurized contact with the inner wall of said casing thereby to secure said conductor-support insulator assembly against longitudinal displacement within said casing.

4. An encapsulated insulation gas-filled high-voltage conductor structure as defined in claim 3 wherein said pneumatic drive for said third leg includes a piston slidable longitudinally with a cylinder portion provided by the interior of said conductor, said piston including a longitudinally extending tapered surface which transmits movement to the inner end of said third leg.

5. An encapsulated insulation gas-filled high-voltage conductor structure as defined in claim 4 wherein said piston is driven by the pressurized insulating gas during the gas filling operation and which is introduced through the conductor.

6. An encapsulated insulation gas-filled high-voltage conductor structure as defined in claim 4 wherein said tapered surface on said piston is so designed that self-locking by friction occurs between it and said third leg when the latter is moved into pressurized contact with the inner wall of said casing.

7. An encapsulated insulation gas-filled high-voltage conductor structure as defined in claim 3 wherein said pneumatic drive includes a piston slidable longitudinally within a cylinder portion provided by the interior of said conductor and which includes a longitudinally extending tapered surface, the inner portion of said third leg being reduced in cross section and received in a cup member extending through an opening in the wall of said conductor to engage said tapered surface of said piston, and spring means provided in the connection between said cup member and said third leg through which the radially outward force is applied to said third leg thereby providing a yieldable connection therebetween to accommodate temperature-induced expansion and contraction of said casing.

8. An encapsulated insulation gas-filled high-voltage conductor structure as defined in claim 7 wherein said spring means are constituted by cup springs which surround said end portion of reduced cross-section.

9. An encapsulated insulation gas-filled high-voltage conductor structure as defined in claim 4 wherein the cylinder portion in which said piston slides is provided by the inner surface of a nipple interposed between and connecting the ends of adjacent conductor sections, said piston having a longitudinal through bore and being slidably supported on a longitudinally extending tubular portion projecting from an end wall of said nipple, a compression spring surrounding said tubular portion having the opposite ends thereof in contact respectively with said end wall and one end of said piston, stop means for said piston located at the free end of said tubular portion, and a port extending through the wall of said nipple adjacent the end wall thereof.

10. An encapsulated insulation gas-filled high-voltage conductor structure as defined in claim 9 wherein the inner end of said third leg is reduced in cross section and received in a cup member extending through an opening in the wall of said nipple to engage said tapered surface of said piston, and spring means provided in the connection between said cup member and said third leg through which the radially outward force is applied to said third leg thereby providing a yieldable connection therebetween to accommodate temperature-induced expansion and contraction of said casing.

* * * * *